United States Patent
Sun et al.

(10) Patent No.: US 10,924,224 B2
(45) Date of Patent: Feb. 16, 2021

(54) METHOD, USER EQUIPMENT, AND BASE STATION FOR TRANSMITTING DATA

(71) Applicant: Huawei Technologies Co., Ltd., Shenzhen (CN)

(72) Inventors: Hao Sun, Beijing (CN); Lixia Xue, Beijing (CN); Yan Cheng, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/869,523

(22) Filed: Jan. 12, 2018

(65) Prior Publication Data

US 2018/0139013 A1 May 17, 2018

Related U.S. Application Data

(63) Continuation of application No. PCT/CN2015/084004, filed on Jul. 14, 2015.

(51) Int. Cl.
  *H04L 1/18* (2006.01)
  *H04W 72/04* (2009.01)
  *H04W 72/12* (2009.01)

(52) U.S. Cl.
  CPC .......... *H04L 1/1854* (2013.01); *H04L 1/1812* (2013.01); *H04L 1/1861* (2013.01);
  (Continued)

(58) Field of Classification Search
  CPC ... H04L 1/1854; H04L 1/1812; H04L 1/1861; H04L 1/1896; H04L 1/1887;
  (Continued)

(56) References Cited

U.S. PATENT DOCUMENTS

| 2005/0207374 A1* | 9/2005 | Petrovic | H04W 28/26 370/331 |
| 2009/0016265 A1* | 1/2009 | Katayama | H04L 1/1819 370/328 |

(Continued)

FOREIGN PATENT DOCUMENTS

| CN | 101227261 A | 7/2008 |
| CN | 102823182 A | 12/2012 |

(Continued)

OTHER PUBLICATIONS

RAN WG1, "LS on the RAN1 Agreements on HSDPA Multiflow," 3GPP TSG RAN WG1 Meeting #68-BIS R1-121915, Jeju, Korea, Mar. 26-30, 2012, 6 pages.

(Continued)

*Primary Examiner* — Ricky Q Ngo
*Assistant Examiner* — Michael K Phillips
(74) *Attorney, Agent, or Firm* — Slater Matsil, LLP

(57) ABSTRACT

Embodiments of the present invention provide a method, user equipment, and a base station for transmitting data. The method for transmitting data includes: receiving, by user equipment UE, multiple hybrid automatic repeat request (HARQ) timings from a base station, where each of multiple data packets to be sent by the UE is corresponding to one of the multiple HARQ timings; receiving, by the UE, multiple HARQ offset parameters from the base station, where the HARQ offset parameters are in one-to-one correspondence with the multiple HARQ timings; obtaining, by the UE using calculation, multiple PHICH resource indexes respectively according to the multiple HARQ offset parameters, where the multiple PHICH resource indexes respectively point to different PHICH resources; and sending, by the UE, the multiple data packets to the base station, determining, and (Continued)

receiving the feedback response on the time domain resource by using the different PHICH resources.

20 Claims, 6 Drawing Sheets

(52) U.S. Cl.
CPC ....... *H04L 1/1896* (2013.01); *H04W 72/0413* (2013.01); *H04W 72/1205* (2013.01)

(58) Field of Classification Search
CPC ....... H04L 5/0055; H04L 1/18; H04L 1/1825; H04L 1/1822; H04L 1/1864; H04W 72/0413; H04W 72/1205; H04W 72/0446; H04W 72/0406; H04W 24/02
See application file for complete search history.

(56) References Cited

U.S. PATENT DOCUMENTS

| | | | |
|---|---|---|---|
| 2011/0090810 A1* | 4/2011 | Park | H04L 1/1854 370/252 |
| 2011/0182215 A1 | 7/2011 | Gorokhov | |
| 2011/0268048 A1 | 11/2011 | Toskala et al. | |
| 2012/0250663 A1 | 10/2012 | Han et al. | |
| 2013/0016688 A1 | 1/2013 | Han et al. | |
| 2013/0044722 A1* | 2/2013 | Kang | H04L 1/1861 370/329 |
| 2013/0188532 A1 | 7/2013 | Zhang et al. | |
| 2013/0308465 A1* | 11/2013 | Xu | H04L 47/27 370/241 |
| 2014/0328333 A1* | 11/2014 | Seo | H04L 1/1664 370/336 |
| 2015/0029890 A1 | 1/2015 | Siomina et al. | |
| 2015/0043461 A1* | 2/2015 | Sachs | H04W 52/0216 370/329 |
| 2015/0098437 A1 | 4/2015 | Chen et al. | |
| 2015/0103796 A1 | 4/2015 | Chung et al. | |
| 2015/0358194 A1* | 12/2015 | Yu | H04L 1/0041 370/329 |
| 2016/0234800 A1* | 8/2016 | Jung | H04L 1/1812 |
| 2016/0249329 A1* | 8/2016 | Au | H04W 48/00 |
| 2016/0330782 A1* | 11/2016 | Ang | H04B 17/364 |
| 2016/0344517 A1* | 11/2016 | Bergstrom | H04L 1/1678 |
| 2017/0230148 A1* | 8/2017 | Xu | H04L 1/1812 |
| 2017/0264398 A1* | 9/2017 | Uchino | H04L 1/1822 |
| 2018/0098337 A1* | 4/2018 | Lee | H04L 27/2602 |
| 2019/0149272 A1* | 5/2019 | Gao | H04L 1/1822 |

FOREIGN PATENT DOCUMENTS

| | | |
|---|---|---|
| CN | 103220104 A | 7/2013 |
| CN | 103825638 A | 5/2014 |
| JP | 2013102481 A | 5/2013 |
| JP | 2015514335 A | 5/2015 |
| JP | 2016541135 A | 12/2016 |
| WO | 2011062384 A2 | 5/2011 |

OTHER PUBLICATIONS

RAN WG1, "LS on the RAN1 agreements on HSDPA Multiflow," 3GPP TSG RAN WG1 Meeting #68-BIS, R1-121915, Jeju, Korea, Mar. 26-30, 2012, 5 pages.

LG Electronics, "Discussion on frame structure for NR," 3GPP TSG RAN WG1 Meeting #84bis, R1-162519, Busan, Korea, Apr. 11-15, 2016, 6 pages.

* cited by examiner

METHOD, USER EQUIPMENT, AND BASE STATION FOR TRANSMITTING DATA

CROSS-REFERENCE TO RELATED APPLICATIONS

This application is a continuation of International Application No. PCT/CN2015/084004, filed on Jul. 14, 2015, the disclosure of which is hereby incorporated by reference in its entirety.

TECHNICAL FIELD

Embodiments of the present invention relate to the field of wireless communications, and more specifically, to a method, user equipment, and a base station for transmitting data.

BACKGROUND

In a Long Term Evolution (LTE) system, a hybrid automatic repeat request (HARQ) timing is used to define a time for a data reception party to return an acknowledgement/negative acknowledgement (ACK/NACK) feedback when user equipment (UE) sends data to a base station or a base station sends data to UE. For example, when a UE sends uplink data to a base station, the HARQ timing is a time for the base station to return an ACK/NACK after the UE sends data to the base station. As shown in FIG. 1, the HARQ timing includes the following times: a time $T_{sf}$ for receiving UE data by the base station and a time $T_{eNB,Proc}$ for processing the data by the base station. $T_{sf}$ is a fixed time length of one subframe, and $T_{eNB,Proc}$ is a time for processing a data packet by the base station. A time length of $T_{eNB,Proc}$ depends on a data processing capability of the base station. Generally, because each subframe has a fixed time length, the HARQ timing may also be measured by using a time length corresponding to a quantity of subframes occupied within a time period. In an existing frequency division duplex (FDD) system, a HARQ timing is fixed 4 ms, that is, a time length of four subframes. However, in a time division duplex (TDD) system, a HARQ timing is related to an uplink-downlink configuration in a frame structure, and is greater than or equal to 4 ms.

As processing capabilities of the UE and the base station gradually increase, $T_{eNB,Proc}$ is reduced. This provides a possibility for reduction of the HARQ timing. In addition, different data services of the UE have different requirements on the HARQ timing. Therefore, a requirement for communication using multiple HARQ timings is raised.

However, an existing communications mechanism of a single HARQ timing cannot handle communications with multiple HARQ timings. For example, this may cause a problem such as a failure of handshake communication. For example, when sending uplink data, the UE needs to send two data packets based on two different HARQ timings, and the HARQ timings corresponding to the two data packets are respectively a time length of four subframes and a time length of two subframes. Assuming that the UE sends, in an $(n+0)^{th}$ subframe, a first data packet, that is, a data packet for which a HARQ timing is the time length of four subframes, the base station feeds back ACK/NACK information for the data packet in an $(n+4)^{th}$ subframe. In addition, assuming that the UE sends, in an $(n+2)^{th}$ subframe, a second data packet, that is, a data packet for which a HARQ timing is the time length of two subframes, the base station also feeds back ACK/NACK information for the data packet in the $(n+4)^{th}$ subframe. Therefore, the UE needs to receive, in the $(n+4)^{th}$ subframe, two pieces of ACK/NACK information simultaneously fed back for the two data packets by the base station. In an existing LTE system, the base station may transmit the two data packets by scheduling a same physical hybrid automatic repeat request indicator channel (Physical hybrid ARQ indicator channel, PHICH) resource, and this causes a PHICH resource conflict between the two data packets, thereby causing a failure of communication.

Therefore, in the existing LTE system, if there are data services in multiple HARQ timings, the UE may need to receive response information for multiple data packets on a same PHICH resource, thereby causing a PHICH resource conflict. Therefore, how to coordinate data communication in multiple HARQ timings for the UE in the system becomes an urgent problem to be resolved.

SUMMARY

Embodiments of the present invention provide a method, user equipment, and a base station for transmitting data. A problem of a PHICH resource conflict during data transmission in multiple HARQ timings may be resolved.

According to a first aspect of embodiments of the present invention, a method for transmitting data is provided. The method includes receiving, by user equipment (UE), multiple hybrid automatic repeat request (HARQ) timings from a base station, where each of multiple data packets to be sent by the UE corresponds to one of the multiple HARQ timings. The method also includes receiving, by the UE, multiple HARQ offset parameters from the base station, where the HARQ offset parameters are in one-to-one correspondence with the multiple HARQ timings. The method also includes respectively obtaining, by the UE using calculation, multiple physical hybrid automatic repeat request indicator channel (PHICH) resource indexes according to the multiple HARQ offset parameters, where the multiple PHICH resource indexes respectively point to different PHICH resources. The method also includes sending, by the UE, the multiple data packets to the base station, determining, according to the multiple HARQ timings, a time domain resource for receiving a feedback response, and receiving the feedback response on the time domain resource using the different PHICH resources.

With reference to the first aspect, in a first possible implementation, the multiple HARQ timings are configured by the base station according to a preset rule and data packet categories to which the multiple data packets respectively belong.

With reference to the first possible implementation of the first aspect, in a second possible implementation, the data packet categories are classified by the UE according to a data packet size, and the preset rule includes that a larger data packet is corresponding to a longer HARQ timing.

With reference to the first possible implementation of the first aspect, in a third possible implementation, the data packet categories are classified by the UE according to a data packet modulation scheme, and the preset rule includes that a more complex data packet modulation scheme is corresponding to a longer HARQ timing.

With reference to the first possible implementation of the first aspect, in a fourth possible implementation, the data packet categories are classified by the UE according to a quality of service QoS delay required by a higher layer of the base station, and the preset rule includes that a longer QoS delay corresponds to a longer HARQ timing.

With reference to any one of the first possible implementation to the fourth possible implementation of the first aspect, in a fifth possible implementation, before the receiving multiple HARQ timings from a base station, the method further includes: sending, by the UE, a shortest HARQ timing that can be processed by the UE to the base station, where the preset rule further includes that a shortest HARQ timing of the multiple HARQ timings is longer than the shortest HARQ timing that can be processed by the UE.

With reference to the first possible implementation of the first aspect, in a sixth possible implementation, the preset rule includes that the multiple HARQ timings are multiple particular HARQ timings; and before the receiving, by UE, multiple HARQ timings from a base station, the method further includes: obtaining, by the UE, a HARQ timing list, where the HARQ timing list includes HARQ timings respectively corresponding to the different data packet categories; searching, by the UE according to the HARQ timing list, for HARQ timings respectively corresponding to the multiple data packets, and using the HARQ timings as the multiple particular HARQ timings; and sending, by the UE, the multiple particular HARQ timings to the base station.

With reference to any one of the first aspect, or the first possible implementation to the sixth possible implementation, in a seventh possible implementation, each of the multiple PHICH resource indexes is a PHICH resource 2-tuple, and the PHICH resource 2-tuple consists of a PHICH resource group index and an orthogonal sequence index in the PHICH resource group.

With reference to the seventh possible implementation of the first aspect, in an eighth possible implementation, respectively obtaining, by the UE using calculation, multiple physical hybrid automatic repeat request indicator channel (PHICH) resource indexes according to the multiple HARQ offset parameters includes: calculating, by the UE, the PHICH resource group index and the orthogonal sequence index that are in the PHICH resource 2-tuple according to the HARQ offset parameters by using the following formulas:

$$n_{PHICH}^{group} = (I_{PRB_{RA}} + n_{HARQ}) \mod N_{PHICH}^{group} + I_{PHICH} N_{PHICH}^{group};$$

and $$n_{PHICH}^{seq} = (\lfloor I_{PRB_{RA}} / N_{PHICH}^{group} \rfloor + n_{HARQ}) \mod 2 N_{SF}^{PHICH},$$

where $n_{HARQ}$ is the HARQ offset parameter, $n_{PHICH}^{group}$ is the PHICH resource group index, $n_{PHICH}^{seq}$ is the orthogonal sequence index, $I_{PRB_{RA}}$ is a start physical resource block (PRB) index of a physical uplink shared channel (PUSCH) resource, $N_{PHICH}^{group}$ is a quantity of PHICH resource groups, $I_{PHICH}$ is a special subframe identifier, and $B_{SF}^{PHICH}$ is a spreading factor of a PHICH resource.

With reference to any one of the first aspect, or the first possible implementation to the eighth possible implementation, in a ninth possible implementation, after receiving the feedback response for occupying the PHICH resources from the base station, the method further includes: receiving, by the UE, data sent by the base station, and sending a bundled response to data in a same binding window to the base station.

According to a second aspect of embodiments of the present invention, a method for transmitting data is provided. The method includes sending, by a base station, multiple hybrid automatic repeat request HARQ timings to user equipment (UE), where each of multiple data packets to be sent by the UE corresponds to one of the multiple HARQ timings. The method also includes sending, by the base station, multiple HARQ offset parameters to the UE, where the HARQ offset parameters are in one-to-one correspondence with the multiple HARQ timings. The method also includes respectively obtaining, by the base station using calculation, multiple physical hybrid automatic repeat request indicator channel (PHICH) resource indexes according to the multiple HARQ offset parameters, where the multiple PHICH resource indexes respectively point to different PHICH resources in a same frequency domain. The method includes receiving, by the base station, the multiple data packets sent by the UE, determining, according to the multiple HARQ timings, a time domain resource for sending a feedback response, and sending the feedback response on the time domain resource using the different PHICH resources.

With reference to the second aspect, in a first possible implementation, the base station configures the multiple HARQ timings according to a preset rule and multiple data packet categories to which the multiple data packets respectively belong.

With reference to the first possible implementation of the second aspect, in a second possible implementation, the data packet categories are classified by the UE according to a data packet size, and the preset rule includes that a larger data packet is corresponding to a longer HARQ timing.

With reference to the first possible implementation of the second aspect, in a third possible implementation, the data packet categories are classified by the UE according to a data packet modulation scheme, and the preset rule includes that a more complex data packet modulation scheme corresponds to a longer HARQ timing.

With reference to the first possible implementation of the second aspect, in a fourth possible implementation, the data packet categories are classified by the UE according to a quality of service (QoS) delay required by a higher layer of the base station, and the preset rule includes that a longer QoS delay is corresponding to a longer HARQ timing.

With reference to any one of the second aspect, or the first possible implementation to the fourth possible implementation of the second aspect, in a fifth possible implementation, before the sending multiple HARQ timings to UE, the method further includes: receiving a shortest HARQ timing that can be processed by the UE, where the preset rule further includes that a shortest HARQ timing of the multiple HARQ timings is longer than the shortest HARQ timing that can be processed by the UE.

With reference to the first possible implementation of the second aspect, in a sixth possible implementation, the preset rule includes that the multiple HARQ timings are multiple particular HARQ timings. Before the sending, by a base station, multiple HARQ timings to UE, the method further includes: receiving, by the base station, the multiple particular HARQ timings sent by the UE. The multiple particular HARQ timings are obtained by the UE by respectively searching, according to a HARQ timing list, for HARQ timings corresponding to the multiple data packets, and the HARQ timing list includes HARQ timings respectively corresponding to the different data packet categories.

With reference to any one of the second aspect, or the first possible implementation to the sixth possible implementation of the second aspect, in a seventh possible implementation, each of the multiple PHICH resource indexes is a PHICH resource 2-tuple, and the PHICH resource 2-tuple consists of a PHICH resource group index and an orthogonal sequence index in the PHICH resource group.

With reference to the seventh possible implementation of the second aspect, in an eighth possible implementation, obtaining, by the base station by using calculation, multiple physical hybrid automatic repeat request indicator channel (PHICH) resource indexes respectively according to the multiple HARQ offset parameters includes: calculating, by the base station, the PHICH resource group index and the orthogonal sequence index that are in the PHICH resource 2-tuple according to the HARQ offset parameters using the following formulas:

$$n_{PHICH}^{group} = (I_{PRB_{RA}} + n_{HARQ}) \bmod N_{PHICH}^{group} + I_{PHICH} N_{PHICH}^{group};$$

and $$n_{PHICH}^{seq} = (\lfloor I_{PRB_{RA}}/N_{PHICH}^{group} \rfloor + n_{HARQ}) \bmod 2N_{SF}^{PHICH},$$

where $n_{HARQ}$ is the HARQ offset parameter, $n_{PHICH}^{group}$ is the PHICH resource group index, $n_{PHICH}^{seq}$ is the orthogonal sequence index, $I_{PRB_{RA}}$ is a start physical resource block (PRB) index of a physical uplink shared channel (PUSCH) resource, $N_{PHICH}^{group}$ is a quantity of PHICH resource groups, $I_{PHICH}$ is a special subframe identifier, and $n_{SF}^{PHICH}$ is a spreading factor of a PHICH resource.

With reference to any one of the second aspect, or the first possible implementation to the eighth possible implementation of the second aspect, in a ninth possible implementation, after the sending, by the base station, the feedback response on the time domain resource by using the different PHICH resources, the method further includes: sending, by the base station, data to the UE, and receiving a bundled response, sent by the UE, to data in a same binding window.

According to a third aspect of embodiments of the present invention, user equipment (UE) for transmitting data is provided. The UE includes a receiving unit, configured to receive multiple hybrid automatic repeat request (HARQ) timings from a base station, where each of multiple data packets to be sent by the UE corresponds to one of the multiple HARQ timings. The receiving unit is further configured to receive multiple HARQ offset parameters from the base station, where the HARQ offset parameters are in one-to-one correspondence with the multiple HARQ timings. The UE also includes a processing unit, configured to obtain, using calculation, multiple physical hybrid automatic repeat request indicator channel (PHICH) resource indexes respectively according to the multiple HARQ offset parameters, where the multiple PHICH resource indexes respectively point to different PHICH resources. The UE also includes a sending unit, configured to send the multiple data packets to the base station. The receiving unit is further configured to determine, according to the multiple HARQ timings, a time domain resource for receiving a feedback response, and receive the feedback response on the time domain resource by using the different PHICH resources.

With reference to the third aspect, in a first possible implementation, the multiple HARQ timings are configured by the base station according to a preset rule and multiple data packet categories to which the multiple data packets respectively belong.

With reference to the first possible implementation of the third aspect, in a second possible implementation, the processing unit classifies the data packet categories according to a data packet size, and the preset rule includes that a larger data packet is corresponding to a longer HARQ timing.

With reference to the first possible implementation of the third aspect, in a third possible implementation, the processing unit classifies the data packet categories according to a data packet modulation scheme, and the preset rule includes that a more complex data packet modulation scheme is corresponding to a longer HARQ timing.

With reference to the first possible implementation of the third aspect, in a fourth possible implementation, the processing unit classifies the data packet categories according to a quality of service (QoS) delay required by a higher layer of the base station, and the preset rule includes that a longer QoS delay is corresponding to a longer HARQ timing.

With reference to any one of the first possible implementation to the fourth possible implementation of the third aspect, in a fifth possible implementation, before the receiving unit receives the multiple HARQ timings from the base station, the sending unit sends a shortest HARQ timing that can be processed by the UE to the base station, where the preset rule further includes that a shortest HARQ timing of the multiple HARQ timings is longer than the shortest HARQ timing that can be processed by the UE.

With reference to the first possible implementation of the third aspect, in a sixth possible implementation, the preset rule includes that the multiple HARQ timings are multiple particular HARQ timings. Before the receiving unit receives the multiple HARQ timings from the base station, the processing unit obtains a HARQ timing list, where the HARQ timing list includes HARQ timings respectively corresponding to the different data packet categories. The processing unit further searches, according to the HARQ timing list, for HARQ timings respectively corresponding to the multiple data packets, and uses the HARQ timings as the multiple particular HARQ timings. The sending unit sends the multiple particular HARQ timings to the base station.

With reference to any one of the third aspect, or the first possible implementation to the sixth possible implementation, in a seventh possible implementation, each of the multiple PHICH resource indexes is a PHICH resource 2-tuple, and the PHICH resource 2-tuple consists of a PHICH resource group index and an orthogonal sequence index in the PHICH resource group.

With reference to the seventh possible implementation of the third aspect, in an eighth possible implementation, formulas used by the processing unit to calculate the PHICH resource group index and the orthogonal sequence index according to the HARQ offset parameters are:

$$n_{PHICH}^{group} = (I_{PRB_{RA}} + n_{HARQ}) \bmod N_{PHICH}^{group} + I_{PHICH} N_{PHICH}^{group};$$

and $$n_{PHICH}^{seq} = (\lfloor I_{PRB_{RA}}/N_{PHICH}^{group} \rfloor + n_{HARQ}) \bmod 2N_{SF}^{PHICH},$$

where $n_{HARQ}$ is the HARQ offset parameter, $n_{PHICH}^{group}$ is the PHICH resource group index, $n_{PHICH}^{seq}$ is the orthogonal sequence index, $I_{PRB_{RA}}$ is a start physical resource block (PRB) index of a physical uplink shared channel (PUSCH) resource, $N_{PHICH}^{group}$ is a quantity of PHICH resource groups, $I_{PHICH}$ is a special subframe identifier, and $N_{SF}^{PHICH}$ is a spreading factor of a PHICH resource.

With reference to any one of the third aspect, or the first possible implementation to the eighth possible implementation, in a ninth possible implementation, after the receiving unit receives the feedback response on the time domain resource using the different PHICH resources, the receiving unit receives data sent by the base station. The sending unit sends a bundled response to data in a same binding window to the base station.

According to a fourth aspect of the embodiments of the present invention, a base station for transmitting data is provided. The base station includes a sending unit, configured to send multiple hybrid automatic repeat request (HARQ) timings to user equipment (UE), where each of multiple data packets to be sent by the UE corresponds to one of the multiple HARQ timings. The sending unit is further configured to send multiple HARQ offset parameters to the UE, where the HARQ offset parameters are in one-to-one correspondence with the multiple HARQ timings. The base station also includes a processing unit, configured to obtain, using calculation, multiple physical hybrid automatic repeat request indicator channel (PHICH) resource indexes respectively according to the multiple HARQ offset parameters, where the multiple PHICH resource indexes respectively point to different PHICH resources. The base station also includes a receiving unit, configured to receive the multiple data packets sent by the UE. The sending unit is further configured to determine, according to the multiple HARQ timings, a time domain resource for sending a feedback response, and send the feedback response on the time domain resource using the different PHICH resources.

With reference to the fourth aspect, in a first possible implementation, the processing unit configures the multiple HARQ timings according to a preset rule and multiple data packet categories to which the multiple data packets respectively belong.

With reference to the first possible implementation of the fourth aspect, in a second possible implementation, the data packet categories are classified by the UE according to a data packet size, and the preset rule includes that a larger data packet corresponds to a longer HARQ timing.

With reference to the first possible implementation of the fourth aspect, in a third possible implementation, the data packet categories are classified by the UE according to a data packet modulation scheme, and the preset rule includes that a more complex data packet modulation scheme is corresponding to a longer HARQ timing.

With reference to the first possible implementation of the fourth aspect, in a fourth possible implementation, the data packet categories are classified by the UE according to a quality of service (QoS) delay required by a higher layer of the base station, and the preset rule includes that a longer QoS delay is corresponding to a longer HARQ timing.

With reference to any one of the first possible implementation to the fourth possible implementation of the fourth aspect, in a fifth possible implementation, before the sending unit sends the multiple HARQ timings to the UE, the receiving unit receives a shortest HARQ timing that can be processed by the UE, where the preset rule further includes that a shortest HARQ timing of the multiple HARQ timings is longer than the shortest HARQ timing that can be processed by the UE.

With reference to the first possible implementation of the fourth aspect, in a sixth possible implementation, the preset rule includes that the multiple HARQ timings are multiple particular HARQ timings. Before the sending unit sends the multiple HARQ timings to the UE, the receiving unit receives the multiple particular HARQ timings sent by the UE, where the multiple particular HARQ timings are obtained by the UE by respectively searching for HARQ timings corresponding to the multiple data packets, and the HARQ timing list includes HARQ timings respectively corresponding to the different data packet categories.

With reference to any one of the fourth aspect, or the first possible implementation to the sixth possible implementation of the fourth aspect, in a seventh possible implementation, each of the multiple PHICH resource indexes is a PHICH resource 2-tuple, and the PHICH resource 2-tuple consists of a PHICH resource group index and an orthogonal sequence index in the PHICH resource group.

With reference to the seventh possible implementation of the fourth aspect, in an eighth possible implementation, respectively obtaining, by a processing unit using calculation, the PHICH resource group index and the orthogonal sequence index in the PHICH resource group according to the multiple HARQ offset parameters, includes: calculating, by the processing unit, the PHICH resource group index and the orthogonal sequence index that are in the PHICH resource 2-tuple according to the HARQ offset parameters using the following formulas:

$$n_{PHICH}^{group} = (I_{PRB_{RA}} + n_{HARQ}) \bmod N_{PHICH}^{group} + I_{PHICH} N_{PHICH}^{group};$$

and $$n_{PHICH}^{seq} = (\lfloor I_{PRB_{RA}} / N_{PHICH}^{group} \rfloor + n_{HARQ}) \bmod 2N_{SF}^{PHICH},$$

where $n_{HARQ}$ is the HARQ offset parameter, $n_{PHICH}^{group}$ is the PHICH resource group index, $n_{PHICH}^{seq}$ is the orthogonal sequence index, $I_{PRB_{RA}}$ is a start physical resource block (PRB) index of a physical uplink shared channel (PUSCH) resource, $N_{PHICH}^{group}$ is a quantity of PHICH resource groups, $I_{PHICH}$ is a special subframe identifier, and $N_{SF}^{PHICH}$ is a spreading factor of a PHICH resource.

With reference to any one of the fourth aspect, or the first possible implementation to the eighth possible implementation of the fourth aspect, in a ninth possible implementation, after the sending unit sends the feedback response on the time domain resource using the different PHICH resources, the sending unit sends data to the UE, and the receiving unit receives a bundled response, sent by the UE, to data in a same binding window.

In the embodiments of the present invention, the multiple PHICH resource indexes that respectively point to the different PHICH resources are obtained using calculation and using the multiple HARQ offset parameters, so that the UE can receive responses in multiple HARQ timings by using the different PHICH resources. This avoids a transmission conflict of response information for data packets in the multiple HARQ timings, and can improve transmission performance of data.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, such as a GSM, a Code Division Multiple Access (CDMA) system, a Wideband Code Division Multiple Access (WCDMA), a general packet radio service (GPRS), and a Long Term Evolution (LTE).

User equipment (UE), also referred to as a mobile terminal, mobile user equipment, or the like, may communicate with one or more core networks by using a radio access network (RAN). The user equipment may be a mobile terminal such as a mobile phone (also referred to as a "cellular" phone) and a computer with a mobile terminal. For example, the user equipment may be a portable, pocket-sized, handheld, computer built-in, or in-vehicle mobile apparatus, which exchanges language and/or data with the radio access network.

A base station may be a base transceiver station (BTS) in the GSM or CDMA, may also be a NodeB in the WCDMA, or may be an evolved NodeB (eNB or e-NodeB, evolutional Node B) in the LTE. This is not limited in the present invention.

Figure 1:
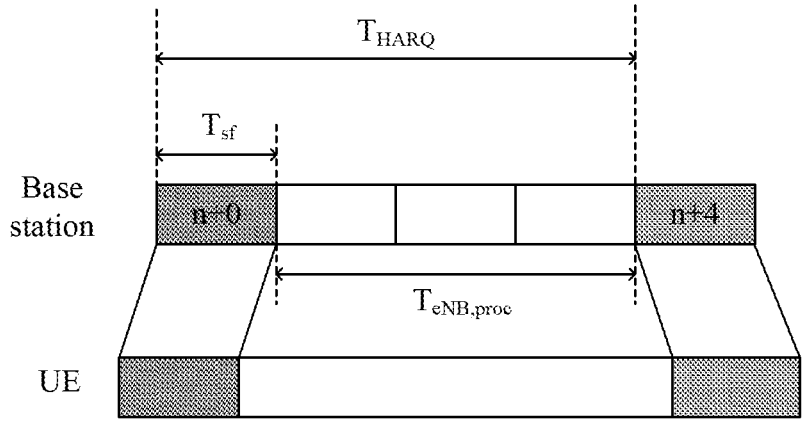
FIG. 1 is a schematic composition diagram of a HARQ timing according to an embodiment.
Figure 2:
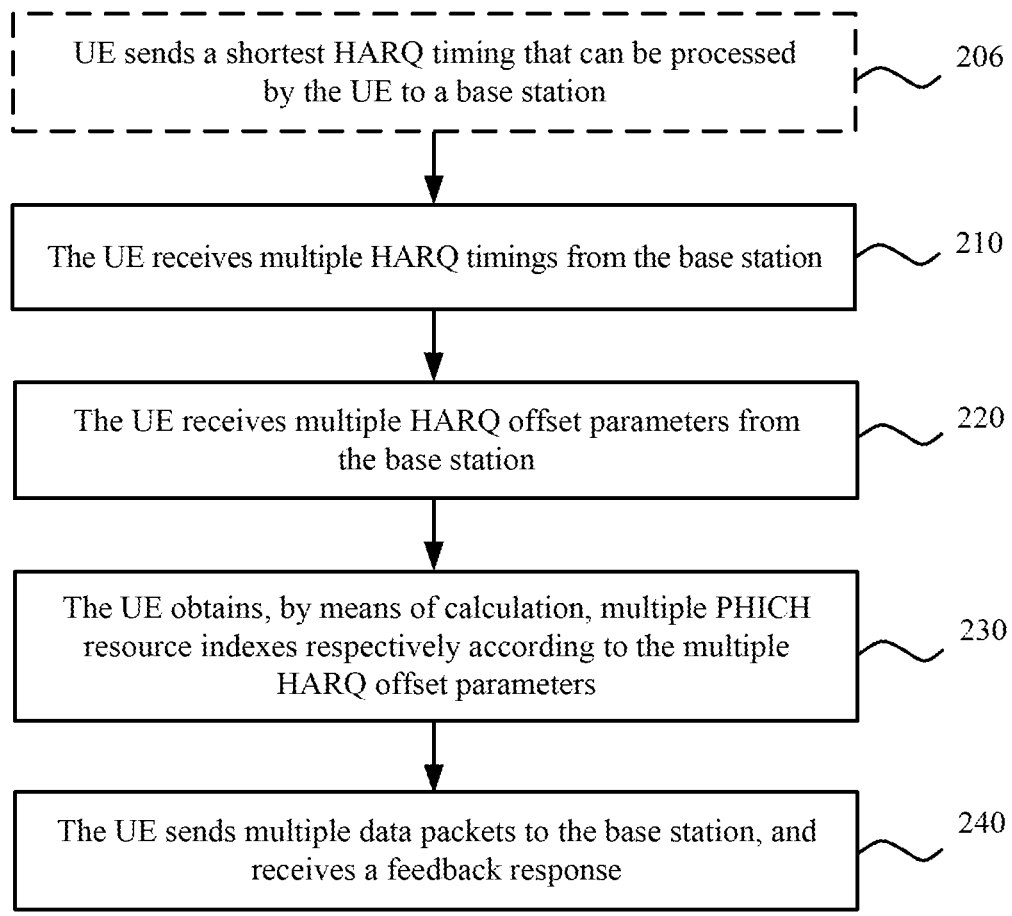
FIG. 2 is a schematic flowchart of a method for transmitting data according to an embodiment of the present invention.

FIG. 2 is a schematic flowchart of a method for transmitting data according to an embodiment of the present invention. The method in FIG. 2 may be executed by UE.

Step 210: The user equipment (UE) receives, from a base station, multiple hybrid automatic repeat request (HARQ) timings configured according to multiple data service categories of the UE, where each of multiple data packets to be sent by the UE corresponds to one of the multiple HARQ timings.

Optionally, the data packets are to-be-transmitted data packets that are packed layer by layer from a higher layer of the UE to a physical layer of the UE, and a format of the data packets meets a requirement of the physical layer of the UE for a data packet.

Optionally, in an embodiment, the multiple HARQ timings are configured by the base station according to a preset rule and data packet categories to which the multiple data packets respectively belong.

Optionally, in an embodiment, the data packet categories are classified by the UE according to a data packet size. A data packet size may be indicated by a size of a physical resource block (PRB) occupied for transmitting a data packet. During transmission, a data packet that occupies more PRBs may be defined as a larger data packet, and a data packet that occupies fewer PRBs may be defined as a smaller data packet. Therefore, the data packets to be transmitted by the UE may be classified into multiple data packet categories according to sizes, and each data packet category corresponds to a specified data packet size range. Correspondingly, the preset rule may include that a larger data packet corresponds to a longer HARQ timing. That is, a data packet category corresponding to a larger data packet may be corresponding to a longer HARQ timing, and a data packet category corresponding to a smaller data packet may be corresponding to a shorter HARQ timing.

Optionally, in another embodiment, the data packet categories are classified by the UE according to a data packet modulation scheme. For example, if the data packets are classified according to quadrature amplitude modulation (QAM), there may be generally modulation schemes such as 4 QAM, 16 QAM, 64 QAM, and 256 QAM. Therefore, the data packets to be transmitted by the UE may be classified into multiple data packet categories according to different modulation schemes. Correspondingly, the preset rule may include that a more complex data packet modulation scheme corresponds to a longer HARQ timing. That is, a data packet category to which a data packet using a more complex modulation scheme such as 256 QAM belongs may be corresponding to a longer HARQ timing, and a data packet category to which a data packet using a simpler modulation scheme such as 4 QAM belongs may be corresponding to a shorter HARQ timing. It should be understood that the QAM modulation is merely an example for description, and the modulation schemes may include but are not limited to different modulation schemes such as ASK, PSK, FSK, and GMSK.

Optionally, in another embodiment, the data packet categories are classified by the UE according to a quality of service (QoS) delay required by a higher layer of the base station. For example, in an LTE standard, the higher layer of the base station requests different data service categories to be defined according to the QoS delay. For example, a service delay of conventional voice requests to be less than or equal to 100 ms, and a service delay of real time games requests to be less than or equal to 50 ms. Therefore, the data packet categories to which the data packets belong may be classified according to different QoS delay requirements. Correspondingly, the preset rule may include that a data packet with a longer QoS delay corresponds to a data packet category with a longer HARQ timing, and a data packet with a shorter QoS delay is corresponding to a data packet category with a shorter HARQ timing.

It should be noted that classification of the data packet categories of the UE and the preset rule shall include but are not limited to those described above. Regardless of how the data packet categories of the UE and the preset rule are classified, each of the multiple data packets of the UE may belong to a corresponding data packet category. The UE receives a HARQ timing configured for the data packet by the base station according to the data packet category and the preset rule.

Optionally, the UE may send a configuration request to the base station, to request the base station to configure the multiple HARQ timings for the UE.

Optionally, in an embodiment, before step 210, the UE may perform step 206. In step 206, the UE sends a shortest HARQ timing that can be processed by the UE to the base station. The preset rule further includes that a shortest HARQ timing of the multiple HARQ timings configured by the base station should be longer than the shortest HARQ timing that can be processed by the UE. For example, if the shortest HARQ timing that can be processed by the UE is a time length of four subframes, the base station may configure a time length of four subframes, a time length of eight subframes, and the like as the multiple HARQ timings for the UE, and should not configure a time length of two subframes as a HARQ timing for the UE.

Figure 3:
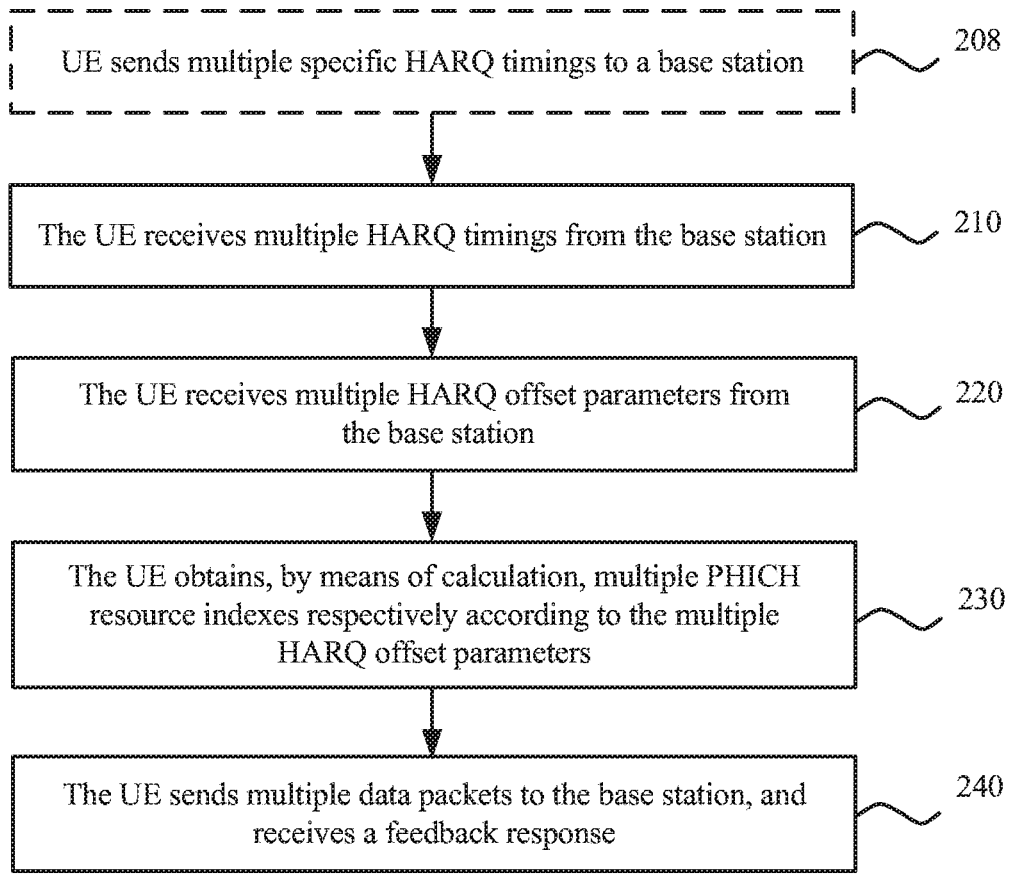
FIG. 3 is a schematic flowchart of a method for transmitting data according to another embodiment of the present invention.
Figure 4:
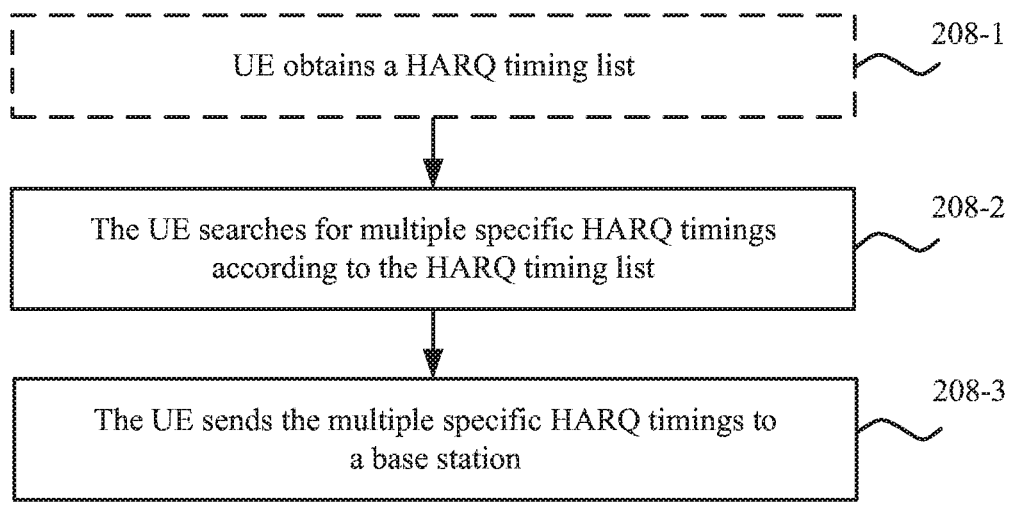
FIG. 4 is a schematic flowchart of a method for sending multiple particular HARQ timings according to an embodiment of the present invention.

FIG. 3 is a schematic flowchart of a method for transmitting data according to another embodiment of the present invention. Steps having a same number in FIG. 2 and FIG. 3 have same meaning. As shown in FIG. 3, before step 210, UE may perform step 208. In step 208, the UE sends multiple particular HARQ timings to a base station. The multiple HARQ timings are the multiple particular HARQ timings. As shown in FIG. 4, step 208 may include the following sub-steps.

Step 208-1: The UE obtains a HARQ timing list, where the HARQ timing list includes HARQ timings that respectively correspond to different data packet categories. For example, the different data packet categories may be the above-mentioned data packet categories classified according to a data packet size, a modulation scheme, or the like, or may be data packet categories classified according to another rule. The UE may receive the HARQ timing list from the base station in an access stage. The base station may correspond to multiple UEs, and each UE may correspond to a different data packet category. The base station may pre-define a HARQ timing for each data packet category of the multiple UEs corresponding to the base station, so as to form a HARQ timing list. Optionally, the UE may also read the HARQ timing list from a storage unit of the UE. For example, the HARQ timing list may be pre-stored in the UE before delivery.

Step 208-2: The UE searches, according to the HARQ timing list, for HARQ timings respectively corresponding to multiple data packets to be sent by the UE, and uses the HARQ timings as multiple particular HARQ timings. A particular HARQ timing is a HARQ timing corresponding to a data packet category of the UE itself. In other words, the UE may determine the particular HARQ timing in a table lookup manner according to the HARQ timing list and according to the data packet category of the UE.

Step 208-3: The UE sends the multiple particular HARQ timings to the base station.

In conclusion, by means of step 210, the user equipment UE receives, from the base station, the multiple HARQ timings configured according to the multiple data packets of the UE.

Step 220: The UE receives multiple HARQ offset parameters from the base station, where the multiple HARQ offset parameters are in one-to-one correspondence with the multiple HARQ timings. That is, each HARQ timing corresponds to one unique HARQ offset parameter. Optionally, the HARQ offset parameter is a natural number. The multiple HARQ offset parameters are described with reference to step 230.

Step 230: The UE obtains, using calculation, multiple physical hybrid automatic repeat request indicator channel (PHICH) resource indexes respectively according to the multiple HARQ offset parameters, where the multiple PHICH resource indexes respectively point to different PHICH resources.

It should be noted that the multiple different PHICH resources may be multiple PHICH resources that have a same time domain resource but have frequency domain resources different from each other, or may be multiple PHICH resources that have a same frequency domain resource but have time domain resources different from each other, or may be multiple PHICH resources that have a same time domain resource and a same frequency domain resource but that can be distinguished from each other by using different coding sequences.

Generally, PHICH resources corresponding to data packets in multiple HARQ timings in a same time domain resource may be mapped to a resource set, that is, a PHICH resource group. A unique PHICH resource corresponding to a data packet in each HARQ timing may be specified by using a PHICH resource index. For example, the PHICH resource index may be a 2-tuple $(n_{PHICH}^{group}, n_{PHICH}^{seq})$, where $n_{PHICH}^{group}$ is a PHICH resource group index, and $n_{PHICH}^{seq}$ is an orthogonal sequence index in the PHICH resource group. In step 210, the multiple HARQ offset parameters received by the UE may be used to calculate multiple PHICH resource indexes. That is, each HARQ offset parameter is used to calculate one PHICH resource index, and different PHICH resource indexes may point to different PHICH resources.

Optionally, in an embodiment, the PHICH resource 2-tuple $(n_{PHICH}^{group}, n_{PHICH}^{seq})$ may be calculated using a group of transmission parameters received from the base station, where the group of transmission parameters may include a start PRB index $I_{PRB_{RA}}$ of a PUSCH resource, a quantity $N_{PHICH}^{group}$ of PHICH resource groups, a spreading factor $N_{SF}^{PHICH}$, and a HARQ offset parameter $n_{HARQ}$.

In the group of transmission parameters, the HARQ offset parameter $n_{HARQ}$ is a key parameter for distinguishing between different HARQ timings. That is, if only another transmission parameter is relied on, the multiple PHICH resource indexes cannot be obtained by means of calculation, that is, the PHICH resources corresponding to the data packet categories in the multiple HARQ timings cannot be distinguished.

A specific calculation manner of the PHICH resource 2-tuple $(n_{PHICH}^{group}, n_{PHICH}^{seq})$ is shown in formula (1) and formula (2):

$$n_{PHICH}^{group} = (I_{PRB_{RA}} + n_{HARQ}) \bmod N_{PHICH}^{group} + I_{PHICH} N_{PHICH}^{group} \qquad (1)$$

$$n_{PHICH}^{seq} = (\lfloor I_{PRB_{RA}} / N_{PHICH}^{group} \rfloor + n_{HARQ}) \bmod 2N_{SF}^{PHICH} \qquad (2)$$

Formula (1) may be used to obtain, using calculation, the PHICH resource group index $n_{PHICH}^{group}$ in the PHICH resource 2-tuple $(n_{PHICH}^{group}, n_{PHICH}^{seq})$.

$I_{PRB_{RA}}$ is a start physical resource block (PRB) index of a physical uplink shared channel (PUSCH) resource. Optionally, before transmitting data, the UE receives the start PRB index allocated by the base station to the UE. Generally, same UE is corresponding to same $I_{PRB_{RA}}$, and different UEs are corresponding to different $I_{PRB_{RA}}$. When different UEs send data services in different HARQ timings to the base station, and need to receive ACK/NACKs from the base station at the same time, $I_{PRB_{RA}}$ may be properly configured to avoid a PHICH resource conflict. However, PHICH resources corresponding to data services in different HARQ timings for the same UE cannot be distinguished only using $I_{PRB_{RA}}$.

Therefore, the HARQ offset parameter $n_{HARQ}$ is used to distinguish between different PHICH resources corresponding to data packet categories in multiple HARQ timings.

$N_{PHICH}^{group}$ is a quantity of PHICH resource groups. Optionally, the HARQ offset parameter $n_{HARQ}$ is a natural number that is greater than 0 and less than $N_{PHICH}^{group}$. That is, the HARQ offset parameter is less than a quantity of resource groups into which the PHICH resources are classified.

$I_{PHICH}$ is a special subframe identifier, and is used to distinguish between two PHICH resources simultaneously transmitted in subframes 0/5 when a TDD structure configuration is 0. In other words, if the TDD structure configuration is not 0, a value of the parameter is 0.

It can be learned from formula (1) that, the UE may obtain, using calculation, a PHICH resource index of each data service category, that is, the resource group index $n_{PHICH}^{group}$ in the PHICH resource 2-tuple, according to the following transmission parameters received from the base station: the start PRB index $I_{PRB_{RA}}$ of the physical uplink shared channel (PUSCH) resource, the HARQ offset parameter $n_{HARQ}$, and the quantity $N_{PHICH}^{group}$ of PHICH resource groups.

A same parameter in formula (2) and formula (1) represents same meaning, and details are not described herein. Formula (2) may be used to obtain, using calculation, the orthogonal sequence index $n_{PHICH}^{seq}$ that is in the PHICH resource group and that is in the PHICH resource 2-tuple $(n_{PHICH}^{group}, n_{PHICH}^{seq})$.

$N_{SF}^{PHICH}$ is a spreading factor of the PHICH resource. Optionally, for a normal cyclic prefix, a value of $N_{SF}^{PHICH}$ is 4; for an extended cyclic prefix, a value of $n_{SF}^{PHICH}$ is 2.

It can be learned from formula (2) that, the UE may further determine the orthogonal sequence index in the PHICH resource group for the UE according to the spreading factor $N_{SF}^{PHICH}$ of the PHICH resource received from the base station, in addition to the foregoing transmission parameters.

According to the PHICH resource group index $n_{PHICH}^{group}$ and the orthogonal sequence index $n_{PHICH}^{seq}$ in the PHICH resource group, the UE may determine the different PHICH resources corresponding to the data packet categories in the multiple HARQ timings using the PHICH resource index.

Figure 5:
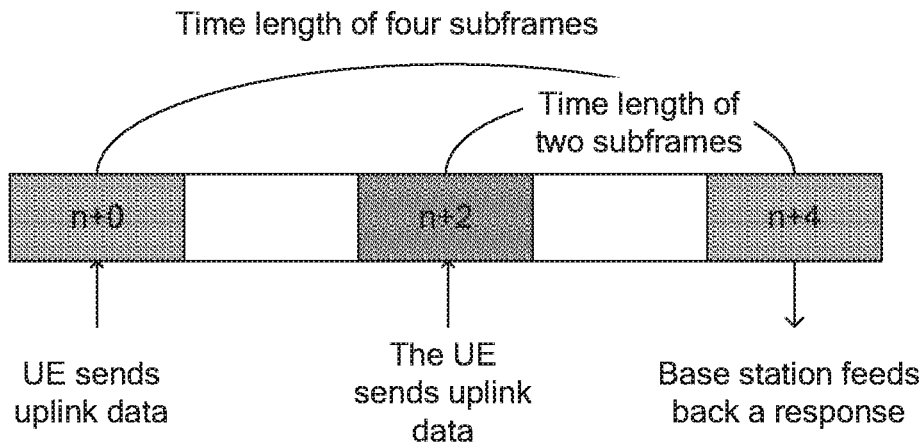
FIG. 5 is a schematic diagram of transmitting data by using multiple HARQ timings according to an embodiment of the present invention.

FIG. 5 is a schematic diagram of transmitting data corresponding to multiple HARQ timings according to an embodiment of the present invention. As shown in FIG. 5, it is assumed that UE needs to transmit two data packets to a base station, corresponding HARQ timings are respectively a time length of two subframes and a time length of four subframes, and a case in which an uplink-downlink subframe configuration is 0 is not included. It is assumed that a quantity $n_{PHICH}^{group}$ of PHICH resource groups is 8, and a spreading factor $N_{SF}^{PHICH}$ is 4. Because the two data packets are sent by same UE, start PRB indexes $I_{PRB_{RA}}$ are the same. That is, if only the foregoing parameters are used, PHICH resource group indexes $n_{PHICH}^{group}$ of the two data packets are totally the same, and cannot be distinguished.

When multiple HARQ offset parameters $n_{HARQ}$ are used, because multiple HARQ offset parameters $n_{HARQ}$ are configured for multiple HARQ timings, different PHICH resource indexes can be obtained by means of calculation. For example, a HARQ offset parameter $n_{HARQ}$ configured for the HARQ timing having the time length of two subframes is 1, and a HARQ offset parameter $n_{HARQ}$ configured for the HARQ timing having the time length of four subframes is 2; in this case, the following can be obtained by using formula (1) and formula (2):

For data whose HARQ timing is the time length of two subframes, a PHICH resource 2-tuple corresponding to the data is (3, 2). For a calculation manner, refer to the following formulas:

$$n_{PHICH}^{group}=11 \bmod 8+0*8=3;$$

and $$n_{PHICH}^{seq}=\lfloor 10/8+1 \rfloor \bmod 8=2.$$

For data whose HARQ timing is the time length of four subframes, a PHICH resource 2-tuple corresponding to the data is (4, 3). For a calculation manner, refer to the following formulas:

$$n_{PHICH}^{group}=12 \bmod 8+0*8=4;$$

and $$n_{PHICH}^{seq}=\lfloor 10/8+2 \rfloor \bmod 8=3.$$

Therefore, the different PHICH resources corresponding to the multiple data packets sent according to the multiple HARQ timings can be distinguished by using the PHICH resource indexes obtained using calculation. It should be understood that, formulas used to calculate the PHICH resource index using the HARQ offset parameter shall not be limited to formula (1) and formula (2).

Step 240: The UE sends the multiple data packets to the base station, determines, according to the multiple HARQ timings, a time domain resource for receiving a feedback response, and receives the feedback response on the time domain resource using the different PHICH resources.

When receiving a feedback for a data packet from the base station, the UE first determines, according to a HARQ timing corresponding to the data packet, a time domain resource/subframe for receiving the feedback response. For example, if a HARQ timing corresponding to a data packet sent in an $(n+0)^{th}$ subframe is 4, the UE may determine that the UE needs to receive a feedback response in an $(n+4)^{th}$ subframe. Then, the UE receives the feedback response ACK/NACK by using a PHICH resource pointed to by the PHICH resource index obtained using calculation in step 230. Optionally, for data that a negative feedback response NACK is received, the UE sends the data again; for data that a positive feedback response ACK is received, the UE does not send the data again.

In this embodiment of the present invention, different PHICH resources corresponding to multiple HARQ timings are obtained by means of calculation using HARQ offset parameters $n_{HARQ}$, so as to avoid a transmission resource conflict of response information, and improve transmission performance of data.

Optionally, in an embodiment, after step 240, the UE may receive data sent by the base station, and make a bundled response to data in a same binding window. In LTE, a bundled ACK/NACK response is: a receiving result of each codeword in multiple downlink subframes is fed back using 1-bit information in an uplink subframe according to a logical AND operation, and a binding window includes these downlink subframes participating in response information binding.

Regardless of an FDD system or a TDD system, in a configuration of multiple HARQ timings, the UE may send, by means of binding, responses to all data in a same binding window. However, if the base station receives a positive feedback response (ACK) when determining a response, the base station side does not need to start a retransmission procedure; or if the base station does not receive a positive feedback response (ACK), the base station needs to retransmit all data packets in the binding window.

In conclusion, in this embodiment of the present invention, the UE obtains, using calculation, the different PHICH resources corresponding to the multiple data packets using the multiple HARQ offset parameters $n_{HARQ}$, and receives the feedback response from the base station by using the different PHICH resources obtained by using calculation. After receiving the data sent by the base station, the UE makes the bundled response to all the data in the same binding window. According to the method, in multiple HARQ timings, it can be ensured that the UE may normally send data to the base station, receive a feedback, receive data from the base station, and send a feedback. This avoids a PHICH resource conflict, thereby reducing transmission errors, and improving data transmission stability.

Figure 6:
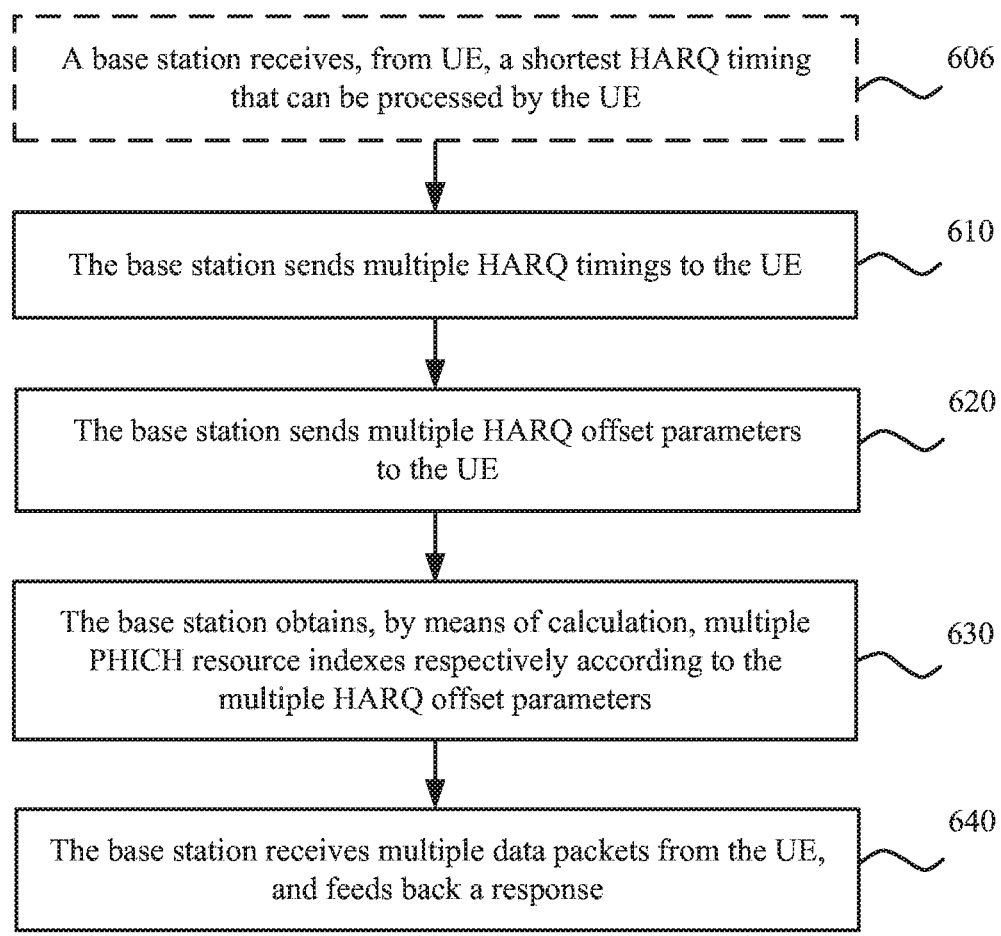
FIG. 6 is a schematic flowchart of a method for transmitting data according to another embodiment of the present invention.

FIG. 6 is a schematic flowchart of a method for transmitting data according to another embodiment of the present invention. The method in FIG. 6 is executed by a base station.

Step 610: The base station sends multiple hybrid automatic repeat request (HARQ) timings to user equipment (UE), where each of multiple data packets to be sent by the UE corresponds to one of the multiple HARQ timings.

Optionally, in an embodiment, the base station configures the multiple HARQ timings according to a preset rule and multiple data packet categories to which the multiple data packets respectively belong.

Optionally, in an embodiment, the data packet categories are classified by the UE according to a data packet size, and the preset rule includes that a larger data packet is corresponding to a longer HARQ timing.

Optionally, in another embodiment, the data packet categories are classified by the UE according to a data packet modulation scheme, and the preset rule includes that a more complex data packet modulation scheme corresponds to a longer HARQ timing.

Optionally, in another embodiment, the data packet categories are classified by the UE according to a quality of service (QoS) delay required by a higher layer of the base station, and the preset rule includes that a longer QoS delay corresponds to a longer HARQ timing.

In step 610, definition of the data packet, classification of the data packet categories, and the preset rule are the same as those in step 210 in FIG. 2. To avoid repetition, details are not further described herein again.

Optionally, the base station may receive a configuration request sent by the UE, and configure the multiple HARQ timings for the UE based on the configuration request.

Optionally, in an embodiment, before step 610, the base station may perform step 606. In step 606, the base station receives a shortest HARQ timing that can be processed and that is sent by the UE, where the preset rule further includes that a shortest HARQ timing of the multiple HARQ timings configured by the base station is longer than the shortest HARQ timing that can be processed by the UE. This case of the preset rule is the same as that in step 206 in FIG. 2. To avoid repetition, details are not further described herein again.

Figure 7:
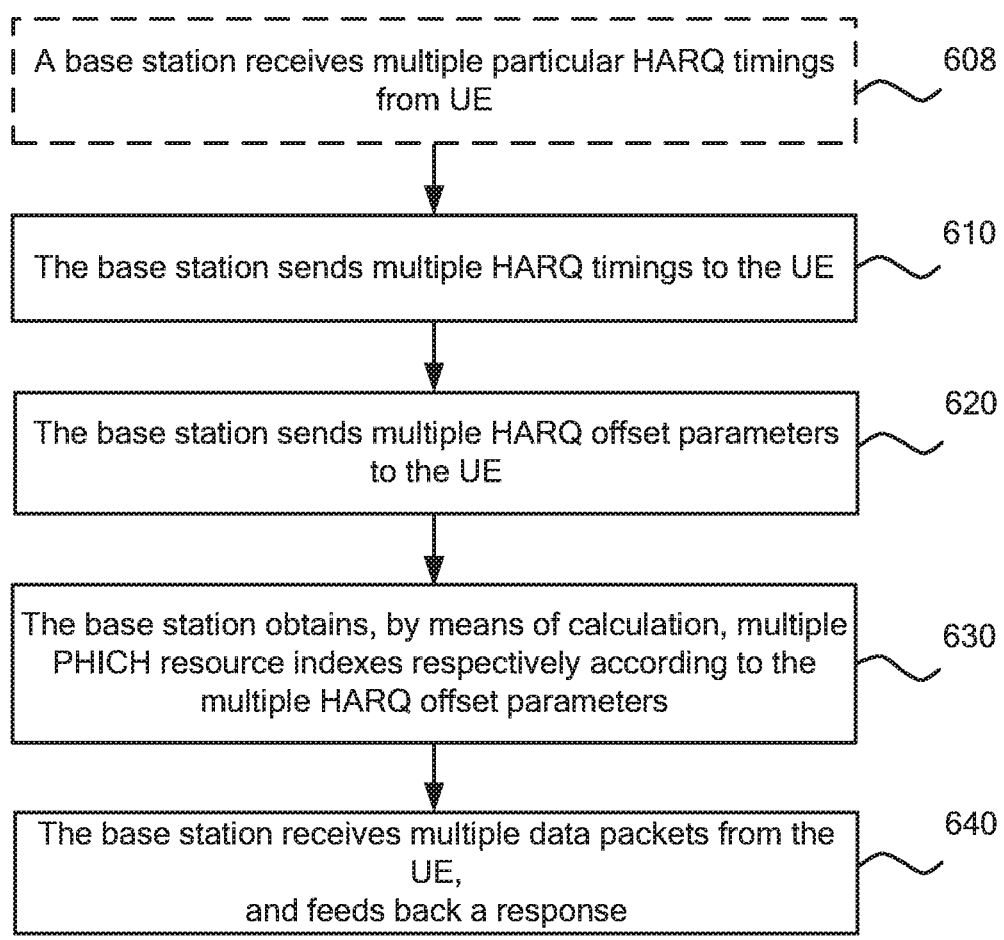
FIG. 7 is a schematic flowchart of a method for transmitting data according to another embodiment of the present invention.

FIG. 7 is a schematic flowchart of a method for transmitting data according to another embodiment of the present invention. Steps having a same number in FIG. 6 and FIG. 7 have same meaning. As shown in FIG. 7, before step 610, UE may perform step 608. In step 608, a base station receives multiple particular HARQ timings sent by the UE, where the preset rule includes that the multiple particular HARQ timings are multiple HARQ timings sent by the base station to the UE. The multiple particular HARQ timings are obtained by the UE by searching, according to a HARQ timing list, for HARQ timings respectively corresponding to multiple data packets, and the HARQ timing list includes HARQ timings respectively corresponding to different data packet categories. Steps in which the UE obtains the multiple particular HARQ timings are the same as step 208-1 and step 208-2 in FIG. 4, and details are not further described herein again.

In conclusion, by means of step 610, the user equipment UE receives, from the base station, the multiple HARQ timings configured according to the multiple data packets of the UE.

Step 620: The base station sends multiple HARQ offset parameters to the UE, where the HARQ offset parameters are in one-to-one correspondence with the multiple HARQ timings.

Step 630: The base station obtains, using calculation, multiple physical hybrid automatic repeat request indicator channel (PHICH) resource indexes respectively according to the multiple HARQ offset parameters, where the multiple PHICH resource indexes respectively point to different PHICH resources. Definition of the different PHICH resources is the same as that in step 230 in FIG. 2, and details are not described herein again.

Optionally, in an embodiment, each of the multiple PHICH resource indexes is a PHICH resource 2-tuple. Each PHICH resource 2-tuple consists of a PHICH resource group index $n_{PHICH}^{group}$ and an orthogonal sequence index $n_{PHICH}^{seq}$ in a PHICH resource group.

Optionally, in an embodiment, the respectively obtaining, by the base station using calculation, PHICH resource indexes respectively according to the multiple HARQ offset parameters, includes: calculating, by the base station, the PHICH resource group index and the orthogonal sequence index that are in the PHICH resource 2-tuple according to the HARQ offset parameters by using formula (1) and formula (2) that are in step 230, that is, $$n_{PHICH}^{group}=(I_{PRB_{RA}}+n_{HARQ})\mod N_{PHICH}^{group}+I_{PHICH}N_{PHICH}^{group};$$

and $$n_{PHICH}^{seq}=(\lfloor I_{PRB_{RA}}/N_{PHICH}^{group}\rfloor+n_{HARQ})\mod 2N_{SF}^{PHICH}$$

where $n_{HARQ}$ is the HARQ offset parameter, $n_{PHICH}^{group}$ is the PHICH resource group index, $n_{PHICH}^{seq}$ is the orthogonal sequence index, $I_{PRB_{RA}}$ is a start physical resource block (PRB) index of a physical uplink shared channel (PUSCH) resource, $N_{PHICH}^{group}$ is a quantity of PHICH resource groups, $I_{PHICH}$ is a special subframe identifier, and $N_{SF}^{PHICH}$ is a spreading factor of a PHICH resource.

It should be understood that, a method for obtaining the multiple PHICH resource indexes by means of calculation by the base station according to the multiple HARQ offset parameters is the same as the method, described in step 230 in FIG. 2, for obtaining the multiple PHICH resource indexes by means of calculation by the UE according to the multiple HARQ offset parameters, and details are not further described herein again.

Step 640: The base station receives the multiple data packets sent by the UE, determines, according to the multiple HARQ timings, a time domain resource for sending a feedback response, and sends the feedback response on the time domain resource using the different PHICH resources.

When sending a feedback for a data packet, the base station first determines, according to a HARQ timing corresponding to the data packet, a time domain resource/subframe for sending the feedback response. For example, if a HARQ timing corresponding to a data packet received in an $(n+0)^{th}$ subframe is 4, the base station may determine that the base station needs to send a feedback response in an $(n+4)^{th}$ subframe. Then, the base station sends the feedback response ACK/NACK using a PHICH resource pointed to by the PHICH resource index obtained by means of calculation in step 630.

Optionally, in an embodiment, after step 640, the base station sends data to the UE, and receives, from the UE, a bundled response to all data in a same binding window.

In this embodiment of the present invention, the base station obtains, using calculation, the different PHICH resources corresponding to the multiple data packets using the HARQ offset parameters $n_{HARQ}$, and sends the feedback response to the UE by using the different PHICH resources obtained using calculation. After sending the data to the UE, the base station receives the bundled response made by the UE to all the data in the same binding window. According to the method, in multiple HARQ timings, it can be ensured that the base station may normally receive data sent by the UE, and send a feedback, send data to the UE, and receive a feedback. This avoids a PHICH resource conflict, thereby reducing transmission errors, and improving data transmission stability.

Figure 8:
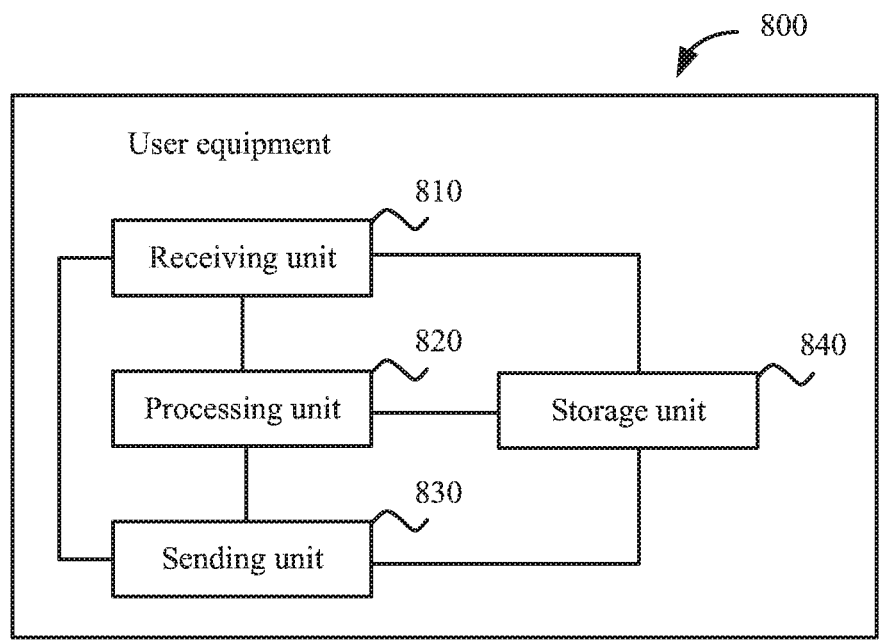
FIG. 8 is a schematic structural diagram of user equipment according to an embodiment of the present invention.

FIG. 8 is a schematic diagram of user equipment according to an embodiment of the present invention. User equipment 800 in FIG. 8 includes a receiving unit 810, a processing unit 820, a sending unit 830, and a storage unit 840. The receiving unit 810, the sending unit 830 the storage unit 840, and the processing unit 820 are connected to each other.

The receiving unit 810 is configured to receive multiple hybrid automatic repeat request (HARQ) timings from a base station, where each of multiple data packets to be sent by the UE corresponds to one of the multiple HARQ timings. The receiving unit 810 is further configured to receive multiple HARQ offset parameters from the base station, where the HARQ offset parameters are in one-to-one correspondence with the multiple HARQ timings.

The processing unit 820 is configured to respectively obtain, using calculation, multiple physical hybrid automatic repeat request indicator channel (PHICH) resource indexes according to the multiple HARQ offset parameters, where the multiple PHICH resource indexes respectively point to different PHICH resources.

The sending unit 830 is configured to send the multiple data packets to the base station.

The receiving unit 810 is further configured to determine, according to the multiple HARQ timings, a time domain resource for receiving a feedback response, and receive the feedback response on the time domain resource using the different PHICH resources.

Optionally, the data packets are to-be-transmitted data packets that are packed by the processing unit 820 layer by layer from a higher layer of the UE to a physical layer of the UE, and a format of the data packets meets a requirement of the physical layer of the UE for a data packet.

Optionally, in an embodiment, the multiple HARQ timings are configured by the base station according to a preset rule and multiple data packet categories to which the multiple data packets respectively belong.

Optionally, in an embodiment, the processing unit 820 classifies the data packet categories according to a data packet size. The preset rule includes that a larger data packet is corresponding to a longer HARQ timing.

Optionally, in an embodiment, the processing unit 820 classifies the data packet categories according to a data packet modulation scheme. The preset rule includes that a more complex data packet modulation scheme is corresponding to a longer HARQ timing.

Optionally, in an embodiment, the processing unit 820 classifies the data packet categories according to a quality of service QoS delay required by a higher layer of the base station. The preset rule includes that a longer QoS delay is corresponding to a longer HARQ timing.

In this embodiment shown in FIG. 8, classification of the data packet categories and the preset rule are the same as those in step 210 in FIG. 2. To avoid repetition, details are not further described herein again.

Optionally, in an embodiment, before the receiving unit 810 receives the multiple HARQ timings from the base station, the sending unit 830 sends a shortest HARQ timing that can be processed by the processing unit 820 to the base station. The preset rule further includes that a shortest HARQ timing of the multiple HARQ timings is longer than the shortest HARQ timing that can be processed by the UE. This case of the preset rule is the same as that in step 206 in FIG. 2. To avoid repetition, details are not further described herein again.

Optionally, in an embodiment, the UE further includes the storage unit 840. The preset rule includes that the multiple HARQ timings are multiple particular HARQ timings. Before the receiving unit 810 receives the multiple HARQ timings from the base station, the processing unit 820 obtains a HARQ timing list, where the HARQ timing list includes HARQ timings respectively corresponding to the different data packet categories. Optionally, the receiving unit 810 receives the HARQ timing list from the base station in an access stage, and sends the HARQ timing list to the processing unit 820. Optionally, the processing unit 820 may also read the HARQ timing list from the storage unit 840, for example, the HARQ timing list may be pre-stored in the storage unit 840 before delivery of the UE.

The processing unit 820 further searches, according to the HARQ timing list, for HARQ timings respectively corresponding to the multiple data packets, and uses the HARQ timings as the multiple particular HARQ timings.

The sending unit 830 sends the multiple particular HARQ timings to the base station.

Optionally, in an embodiment, each of the multiple PHICH resource indexes is a PHICH resource 2-tuple, and each PHICH resource 2-tuple consists of a PHICH resource group index $n_{PHICH}^{group}$ and an orthogonal sequence index $n_{PHICH}^{seq}$ in a PHICH resource group. The respectively obtaining, by the processing unit 820 using calculation, multiple PHICH resource indexes according to the multiple HARQ offset parameters includes: calculating, by the processing unit 820, the PHICH resource group index and the orthogonal sequence index that are in the PHICH resource 2-tuple according to the HARQ offset parameters by using formula (1) and formula (2) that are in step 230, that is, $$n_{PHICH}^{group} = (I_{PRB_{RA}} + n_{HARQ}) \bmod N_{PHICH}^{group} + I_{PHICH} N_{PHICH}^{group};$$

and $$n_{PHICH}^{seq} = (\lfloor I_{PRB_{RA}}/N_{PHICH}^{group} \rfloor + n_{HARQ}) \bmod 2N_{SF}^{PHICH},$$

where $n_{HARQ}$ is the HARQ offset parameter, $n_{PHICH}^{group}$ is the PHICH resource group index, $n_{PHICH}^{seq}$ is the orthogonal sequence index, $I_{PRB_{RA}}$ is a start physical resource block (PRB) index of a physical uplink shared channel (PUSCH) resource, $N_{PHICH}^{group}$ is a quantity of PHICH resource groups, $I_{PHICH}$ is a special subframe identifier, and $N_{SF}^{PHICH}$ is a spreading factor of a PHICH resource. It should be understood that, a method for obtaining the multiple PHICH resource indexes using calculation by the processing unit 820 according to the multiple HARQ offset parameters is the same as the method, described in step 230 in FIG. 2, for obtaining the multiple PHICH resource indexes by means of calculation by the UE according to the multiple HARQ offset parameters, and details are not further described herein again.

Optionally, in an embodiment, after the feedback response for occupying the PHICH resource is received from the base station, further including: the receiving unit 810 is further configured to receive data sent by the base station, and the sending unit 830 is further configured to send a bundled response to data in a same binding window to the base station.

In this embodiment of the present invention, the UE obtains, using calculation, the different PHICH resources corresponding to the multiple data packets by using the multiple HARQ offset parameters $n_{HARQ}$, and receives the feedback response from the base station using the different PHICH resources obtained using calculation. After receiving the data sent by the base station, the UE makes the bundled response to all the data in the same binding window. According to the method, in multiple HARQ timings, it can be ensured that the UE may normally send data to the base station, receive a feedback, receive data from the base station, and send a feedback. This avoids a PHICH resource conflict, thereby reducing transmission errors, and improving data transmission stability.

Figure 9:
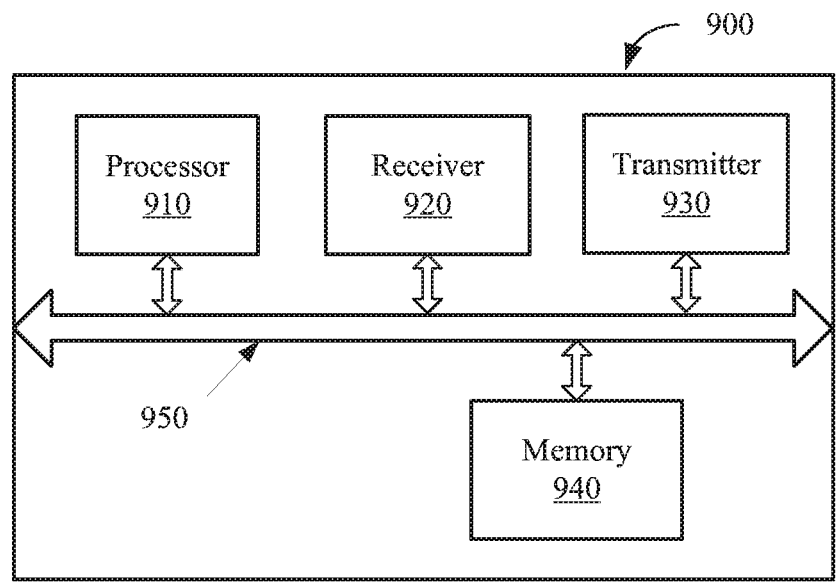
FIG. 9 is a schematic structural diagram of user equipment according to another embodiment of the present invention.

It should be noted that, in this embodiment of the present invention, the receiving unit 810 may be implemented by a receiver, the sending unit 830 may be implemented by a transmitter, the processing unit 820 may be implemented by a processor, and the storage unit 840 may be implemented by a memory 940. As shown in FIG. 9, user equipment 900 may include a processor 910, a receiver 920, a transmitter 930, and the memory 940. The memory 940 may be configured to store a program/code pre-installed before delivery of the UE, or may store code or the like executed by the processor 910.

Components of the user equipment 900 are coupled together by using a bus system 950. In addition to a data bus, the bus system 950 includes a power bus, a control bus, and a status signal bus.

Figure 10:
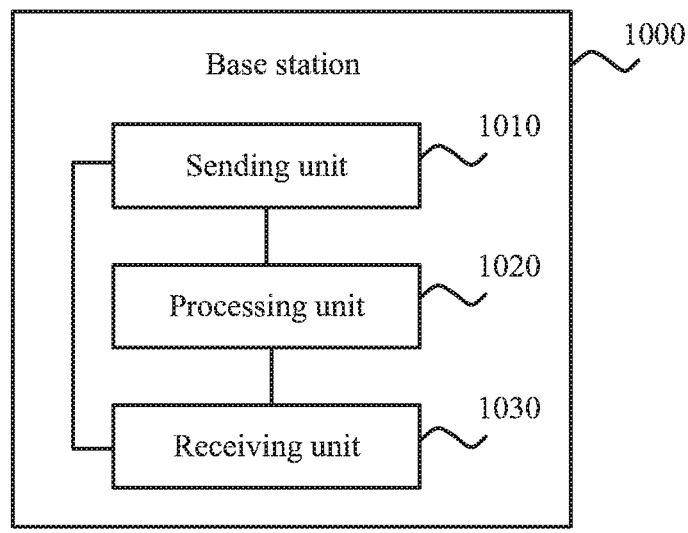
FIG. 10 is a schematic structural diagram of a base station according to an embodiment of the present invention.

FIG. 10 is a schematic diagram of a base station according to an embodiment of the present invention. The base station 1000 in FIG. 10 includes a sending unit 1010, a processing unit 1020, and a receiving unit 1030. Both the sending unit 1010 and the receiving unit 1030 are connected to the processing unit 1020.

The sending unit 1010 is configured to send multiple hybrid automatic repeat request (HARQ) timings to user equipment UE, where each of multiple data packets to be sent by the UE is corresponding to one of the multiple HARQ timings. The sending unit 1010 is further configured to send multiple HARQ offset parameters to the UE, where the HARQ offset parameters are in one-to-one correspondence with the multiple HARQ timings.

The processing unit 1020 is configured to obtain, using calculation, multiple physical hybrid automatic repeat request indicator channel (PHICH) resource indexes respectively according to the multiple HARQ offset parameters, where the multiple PHICH resource indexes respectively point to different PHICH resources.

The receiving unit 1030 is configured to receive the multiple data packets sent by the UE.

The sending unit 1010 is further configured to determine, according to the multiple HARQ timings, a time domain resource for receiving a feedback response, and receive the feedback response on the time domain resource using the different PHICH resources.

Optionally, in an embodiment, the processing unit 1020 configures the multiple HARQ timings according to a preset rule and multiple data packet categories to which the multiple data packets respectively belong.

The data packet categories are classified by the UE according to a data packet size, and the preset rule includes that a larger data packet is corresponding to a longer HARQ timing.

Optionally, in another embodiment, the data packet categories are classified by the UE according to a data packet modulation scheme, and the preset rule includes that a more complex data packet modulation scheme is corresponding to a longer HARQ timing.

Optionally, in another embodiment, the data packet categories are classified by the UE according to a quality of service (QoS) delay required by a higher layer of the base station, and the preset rule includes that a longer QoS delay is corresponding to a longer HARQ timing.

In this embodiment shown in FIG. 10, definition of the data packet, classification of the data packet categories, and the preset rule are the same as those in step 210 in FIG. 2. To avoid repetition, details are not further described herein again.

Optionally, in an embodiment, before the sending unit 1010 sends the multiple HARQ timings to the UE. The receiving unit 1030 receives a shortest HARQ timing that can be processed by the UE, where the preset rule further includes that a shortest HARQ timing of the multiple HARQ timings configured by the processing unit 1020 is longer than the shortest HARQ timing that can be processed by the UE. This case of the preset rule is the same as that in step 206 in FIG. 2. To avoid repetition, details are not further described herein again.

Optionally, in an embodiment, the preset rule includes that the multiple HARQ timings are multiple particular HARQ timings. Before the sending unit 1010 sends the multiple HARQ timings to the UE, the receiving unit 1030 receives the multiple particular HARQ timings sent by the UE. The multiple particular HARQ timings are obtained by the UE by searching for HARQ timings respectively corresponding to the multiple data packets. A HARQ timing list includes HARQ timings respectively corresponding to the different data packet categories.

Optionally, in an embodiment, each of the multiple PHICH resource indexes is a PHICH resource 2-tuple. Each PHICH resource 2-tuple consists of a PHICH resource group index $n_{PHICH}^{group}$ and an orthogonal sequence index $n_{PHICH}^{group}$ in a PHICH resource group.

Optionally, in an embodiment, the respectively obtaining, by the processing unit by means of calculation, the PHICH resource group index and the orthogonal sequence index in the PHICH resource group according to the multiple HARQ offset parameters includes: calculating, by the processing unit 1020, the PHICH resource group index and the orthogonal sequence index that are in the PHICH resource 2-tuple according to the HARQ offset parameters using formula (1) and formula (2) that are in step 230, that is, $$n_{PHICH}^{group}=(I_{PRB_{RA}}+n_{HARQ})\bmod N_{PHICH}^{group}+I_{PHICH}N_{PHICH}^{group};$$

and $$n_{PHICH}^{seq}=(\lfloor I_{PRB_{RA}}/N_{PHICH}^{group}\rfloor+n_{HARQ})\bmod 2N_{SF}^{PHICH},$$

where $n_{HARQ}$ is the HARQ offset parameter, $n_{PHICH}^{group}$ is the PHICH resource group index, $n_{PHICH}^{seq}$ is the orthogonal sequence index, $I_{PRB_{RA}}$ is a start physical resource block (PRB) index of a physical uplink shared channel (PUSCH) resource, $N_{PHICH}^{group}$ is a quantity of PHICH resource groups, $I_{PHICH}$ is a special subframe identifier, and $N_{SF}^{PHICH}$ is a spreading factor of a PHICH resource.

It should be understood that a method for obtaining the multiple PHICH resource indexes using calculation by the processing unit 1020 according to the multiple HARQ offset parameters is the same as the method, described in step 230 in FIG. 2, for obtaining the multiple PHICH resource indexes using calculation by the UE according to the multiple HARQ offset parameters, and details are not further described herein again.

Optionally, in an embodiment, after the sending unit 1010 sends the feedback by using the different PHICH resources, the sending unit 1010 sends data to the UE, and the receiving unit 1030 receives a bundled response, sent by the UE, to data in a same binding window.

In this embodiment of the present invention, the base station obtains, by means of calculation, the different PHICH resources corresponding to the multiple data packets by using the HARQ offset parameters $n_{HARQ}$, and sends the feedback response to the UE using the different PHICH resources obtained using calculation. After sending the data to the UE, the base station receives the bundled response made by the UE to all the data in the same binding window. According to the method, in multiple HARQ timings, it can be ensured that the base station may normally receive data sent by the UE, and send a feedback, send data to the UE, and receive a feedback. This avoids a PHICH resource conflict, thereby reducing transmission errors, and improving data transmission stability.

Figure 11:
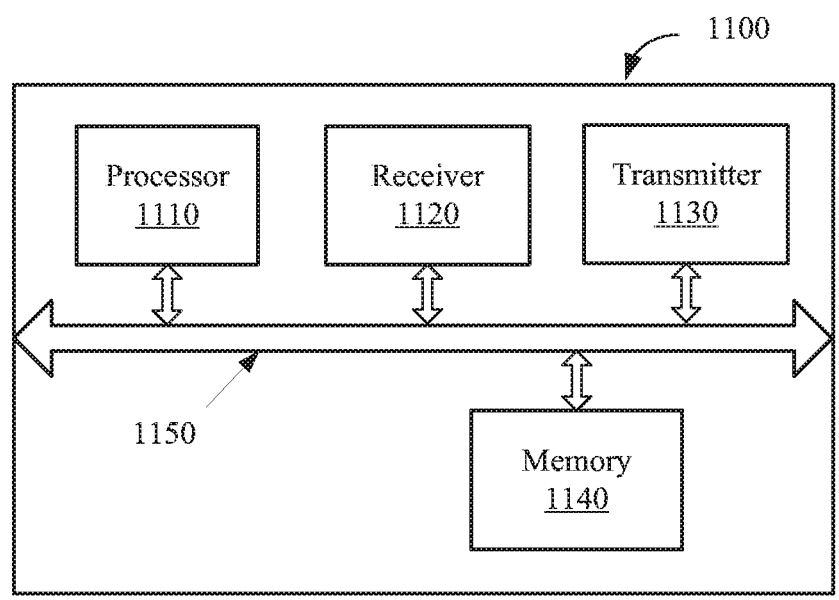
FIG. 11 is a schematic structural diagram of a base station according to another embodiment of the present invention.

It should be noted that, in this embodiment of the present invention, the receiving unit 1030 may be implemented by a receiver, the sending unit 1010 may be implemented by a transmitter, and the processing unit 1020 may be implemented by a processor. As shown in FIG. 11, a base station 1100 may include a processor 1110, a receiver 1120, a transmitter 1130, and a memory 1140. The memory 1140 may be configured to store code or the like executed by the processor 1110.

Components of the base station 1100 are coupled together by using a bus system 1150. In addition to a data bus, the bus system 1150 includes a power bus, a control bus, and a status signal bus.

A communications system according to an embodiment of the present invention may include the foregoing user equipment 800 and base station 900.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, a network device or the like) to perform all or some of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:
1. A method, comprising:
 sending, by user equipment (UE), a shortest hybrid automatic repeat request (HARQ) timing that can be processed by the UE to a base station;

in response to sending the shortest HARQ timing that can be processed by the UE to the base station, receiving, by the UE, a plurality of HARQ timings from the base station, wherein a shortest HARQ timing of the plurality of HARQ timings is longer than or equal to the shortest HARQ timing that can be processed by the UE, each of the plurality of HARQ timings is associated with a different data packet category of a plurality of data packet categories, and the plurality of data packet categories are categories of data packet sizes, data packet modulation schemes, or quality of service (QoS) delay requirements; and sending, by the UE, a plurality of data packets to the base station, wherein each of the plurality of data packets respectively corresponds to one of the plurality of HARQ timings, and each of the plurality of HARQ timings is used for at least one of the plurality of data packets.

2. The method according to claim 1, wherein the plurality of HARQ timings are configured by the base station according to a preset rule and the plurality of data packet categories, and each data packet of the plurality of data packets respectively belongs to a data packet category of the plurality of data packet categories.

3. The method according to claim 2, wherein the plurality of data packets are classified by the UE into the plurality of data packet categories according to data packet sizes, and the preset rule instructs that data packet categories corresponding to larger data packet sizes correspond to longer HARQ timings.

4. The method according to claim 2, wherein the plurality of data packets are classified by the UE into the plurality of data packet categories according to data packet modulation schemes, and the preset rule instructs that data packet categories corresponding to more complex data packet modulation schemes correspond to longer HARQ timings.

5. The method according to claim 2, wherein the plurality of data packets are classified by the UE into the plurality of data packet categories according to QoS delays required by a higher layer of the base station, and the preset rule instructs that data packet categories corresponding to longer QoS delays correspond to longer HARQ timings.

6. A method, comprising:

receiving, by a base station from a user equipment (UE), a shortest hybrid automatic repeat request (HARQ) timing that can be processed by the UE;

in response to receiving the shortest HARQ timing that can be processed by the UE, sending, by the base station, a plurality of HARQ timings to the UE, wherein a shortest HARQ timing of the plurality of HARQ timings is longer than or equal to the shortest HARQ timing that can be processed by the UE, each of the plurality of HARQ timings is associated with a different data packet category of a plurality of data packet categories, and the plurality of data packet categories are categories of data packet sizes, data packet modulation schemes, or quality of service (QoS) delay requirements; and receiving, by the base station, a plurality of data packets sent by the UE, wherein each of the plurality of data packets respectively corresponds to one of the plurality of HARQ timings, and each of the plurality of HARQ timings is used for at least one of the plurality of data packets.

7. The method according to claim 6, wherein the base station configures the plurality of HARQ timings according to a preset rule and the plurality of data packet categories, and wherein each data packet of the plurality of data packets respectively belongs to a data packet category of the plurality of data packet categories.

8. The method according to claim 7, wherein the plurality of data packets are classified by the UE into the plurality of data packet categories according to data packet sizes, and the preset rule instructs that data packet categories corresponding to larger data packet sizes correspond to longer HARQ timings.

9. The method according to claim 7, wherein the plurality of data packets are classified by the UE into the plurality of data packet categories according to data packet modulation schemes, and the preset rule instructs that data packet categories that correspond to a more complex data packet modulation scheme correspond to longer HARQ timings.

10. The method according to claim 7, wherein the plurality of data packets are classified by the UE into the plurality of data packet categories according to quality of service (QoS) QoS delays required by a higher layer of the base station, and the preset rule instructs that data packet categories corresponding to a longer QoS delay correspond to longer HARQ timings.

11. User equipment (UE), comprising:

a transmitter, configured to send a shortest hybrid automatic repeat request (HARQ) timing that can be processed by the UE to a base station; and a receiver, configured to, in response to sending the shortest HARQ timing that can be processed by the UE, receive a plurality of HARQ timings from the base station, wherein a shortest HARQ timing of the plurality of HARQ timings is longer than or equal to the shortest HARQ timing that can be processed by the UE, each of the plurality of HARQ timings is associated with a different data packet category of a plurality of data packet categories, and the plurality of data packet categories are categories of data packet sizes, data packet modulation schemes, or quality of service (QoS) delay requirements; and wherein the transmitter is further configured to send a plurality of data packets to the base station, wherein each of the plurality of data packets respectively corresponds to one of the plurality of HARQ timings, and each of the plurality of HARQ timings is used for at least one of the plurality of data packets.

12. The user equipment according to claim 11, wherein the plurality of HARQ timings are configured by the base station according to a preset rule and the plurality of data packet categories, and wherein each data packet of the plurality of data packets respectively belongs to a data packet category of the plurality of data packet categories.

13. The user equipment according to claim 12, further comprising:

a processor; and a computer-readable storage medium storing a program to be executed by the processor, the program including instructions for:

classifying the plurality of data packets into the plurality of data packet categories according to data packet sizes; and wherein the preset rule instructs that data packet categories corresponding to larger data packet sizes correspond to longer HARQ timings.

14. The user equipment according to claim 12, further comprising:
- a processor; and
- a computer-readable storage medium storing a program to be executed by the processor, the program including instructions for:
  - classifying the plurality of data packets into the plurality of data packet categories according to data packet modulation schemes; and
  - wherein the preset rule instructs that data packet categories corresponding to more complex data packet modulation schemes correspond to longer HARQ timings.

15. The user equipment according to claim 12, further comprising:
- a processor; and
- a computer-readable storage medium storing a program to be executed by the processor, the program including instructions for:
  - classifying the plurality of data packets into the plurality of data packet categories according to QoS delays required by a higher layer of the base station; and
  - wherein the preset rule instructs that data packet categories corresponding to longer QoS delays correspond to longer HARQ timings.

16. A base station, comprising:
- a receiver, configured to receive a shortest hybrid automatic repeat request (HARQ) timing that can be processed by user equipment (UE); and
- a transmitter, configured to, in response to receiving the shortest HARQ timing that can be processed by the UE, send a plurality of HARQ timings to the UE, wherein a shortest HARQ timing of the plurality of HARQ timings is longer than or equal to the shortest HARQ timing that can be processed by the UE, each of the plurality of HARQ timings is associated with a different data packet category of a plurality of data packet categories, and the plurality of data packet categories are categories of data packet sizes, data packet modulation schemes, or quality of service (QoS) delay requirements; and
- wherein the receiver is further configured to receive a plurality of data packets sent by the UE, wherein each of the plurality of data packets respectively corresponds to one of the plurality of HARQ timings, and each of the plurality of HARQ timings is used for at least one of the plurality of data packets.

17. The base station according to claim 16, further comprising:
- a processor; and
- a computer-readable storage medium storing a program to be executed by the processor, the program including instructions for:
  - configuring the plurality of HARQ timings according to a preset rule and the plurality of data packet categories, and wherein each data packet of the plurality of data packets respectively belongs to a data packet category of the plurality of data packet categories.

18. The base station according to claim 17, wherein the plurality of data packets are classified by the UE into the plurality of data packet categories according to data packet sizes, and the preset rule instructs that data packet categories corresponding to larger data packet sizes correspond to longer HARQ timings.

19. The base station according to claim 17, wherein the plurality of data packets are classified by the UE into the plurality of data packet categories according to data packet modulation schemes, and the preset rule instructs that data packet categories corresponding to more complex data packet modulation scheme correspond to longer HARQ timings.

20. The base station according to claim 17, wherein the plurality of data packets are classified by the UE into the plurality of data packet categories according to QoS delays required by a higher layer of the base station, and the preset rule instructs that longer QoS delays correspond to longer HARQ timings.

* * * * *

UNITED STATES PATENT AND TRADEMARK OFFICE
CERTIFICATE OF CORRECTION

PATENT NO. : 10,924,224 B2
APPLICATION NO. : 15/869523
DATED : February 16, 2021
INVENTOR(S) : Hao Sun Page 1 of 1

It is certified that error appears in the above-identified patent and that said Letters Patent is hereby corrected as shown below:

In the Claims

Column 24, Lines 19-20, Claim 10, delete "quality of service (QoS) QoS" and insert --QoS--.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*